US008104823B2

(12) United States Patent
Kohlstrand

(10) Patent No.: US 8,104,823 B2
(45) Date of Patent: Jan. 31, 2012

(54) AUTOMOTIVE DOOR WITH HYDRAULICALLY LOCKING REPOSITIONABLE IMMOBILIZER

(75) Inventor: Kelly M. Kohlstrand, Wyandotte, MI (US)

(73) Assignee: Ford Global Technologies, Dearborn, MI (US)

( * ) Notice: Subject to any disclaimer, the term of this patent is extended or adjusted under 35 U.S.C. 154(b) by 936 days.

(21) Appl. No.: 12/118,149

(22) Filed: May 9, 2008

(65) Prior Publication Data

US 2008/0309118 A1 Dec. 18, 2008

Related U.S. Application Data

(60) Provisional application No. 60/944,339, filed on Jun. 15, 2007.

(51) Int. Cl.
*B60J 5/00* (2006.01)

(52) U.S. Cl. ............. 296/146.1; 296/146.2; 296/146.11; 16/82; 49/334

(58) Field of Classification Search ............. 296/146.11, 296/146.1, 146.2; 49/26, 27, 28, 324, 333, 49/334; 16/82; *B60J 5/00*
See application file for complete search history.

(56) References Cited

U.S. PATENT DOCUMENTS

| | | | |
|---|---|---|---|
| 1,735,024 A | 11/1929 | Toncray | |
| 2,117,060 A | 5/1938 | Gouse | |
| 2,176,641 A | 10/1939 | Schonitzer | |
| 3,650,557 A | 3/1972 | Dudley | |
| 3,664,514 A | 5/1972 | Drake | |
| 3,792,777 A | 2/1974 | Drake | |
| 3,965,531 A | 6/1976 | Fox et al. | |
| 4,332,056 A | 6/1982 | Griffin et al. | |
| 4,458,446 A | 7/1984 | Mochida et al. | |
| 4,658,468 A | 4/1987 | Tillmann et al. | |
| 4,756,051 A * | 7/1988 | Shy | 16/50 |
| 4,788,743 A | 12/1988 | Okumura | |
| 4,815,163 A | 3/1989 | Simmons | |
| 5,074,010 A | 12/1991 | Gignac et al. | |
| 5,090,521 A * | 2/1992 | Miura | 188/82.1 |
| 5,346,272 A | 9/1994 | Priest et al. | |
| 5,426,819 A | 6/1995 | Rohn | |
| 5,560,079 A | 10/1996 | Jeynes | |

(Continued)

FOREIGN PATENT DOCUMENTS

EP 1126111 2/2001

(Continued)

OTHER PUBLICATIONS

"Improvised pneumatic cylinder from a screen door closer," (Feb. 15, 2007), http://wolfstone.halloweenhost.com/HalloweenTech/pnucls_PneumaticCloser.html.

(Continued)

*Primary Examiner* — Glenn Dayoan
*Assistant Examiner* — Pinel Romain
(74) *Attorney, Agent, or Firm* — Jerome R. Drouillard; Greg P. Brown

(57) ABSTRACT

An automotive vehicle includes one or more swinging doors which may be immobilized in a number of positions, so as to allow the doors to be used to assist passengers upon entering and leaving the vehicle. The motion of the door may be damped, or stopped entirely, either at the discretion of a vehicle occupant, or automatically, in the event that the door is driven by external forces to swing at a high rate.

10 Claims, 3 Drawing Sheets

U.S. PATENT DOCUMENTS

| | | | |
|---|---|---|---|
| 5,829,097 | A | 11/1998 | Toledo |
| 6,065,185 | A | 5/2000 | Breed et al. |
| 6,135,536 | A | 10/2000 | Ciavaglia |
| 6,349,448 | B1 | 2/2002 | Breed et al. |
| 6,353,968 | B1 | 3/2002 | Shyu et al. |
| 6,370,732 | B1 | 4/2002 | Yezersky |
| 6,382,706 | B2 | 5/2002 | Yuge et al. |
| 6,348,794 | B1 | 8/2002 | Ng et al. |
| 6,446,305 | B1 | 9/2002 | Kneeland |
| 6,476,126 | B1 | 10/2002 | Yezersky et al. |
| 6,513,193 | B1 | 2/2003 | Yezersky et al. |
| 6,532,627 | B2 | 3/2003 | Audisio |
| 6,618,899 | B1 | 9/2003 | Ginzel et al. |
| 6,681,444 | B2 | 1/2004 | Breed et al. |
| 6,711,778 | B2 | 3/2004 | Sparkman |
| 6,753,777 | B2 | 6/2004 | Li |
| 6,880,204 | B2 | 4/2005 | Ochiai |
| 6,928,694 | B2 | 8/2005 | Breed et al. |
| 6,928,695 | B2 | 8/2005 | Ochiai |
| 6,947,818 | B1 | 9/2005 | Li |
| 6,976,289 | B1 | 12/2005 | Luca |
| 6,993,808 | B1 | 2/2006 | Bennett et al. |
| 7,007,341 | B2 | 3/2006 | Wang |
| 7,147,266 | B2 | 12/2006 | Huntsman et al. |
| 7,175,227 | B2 | 2/2007 | Menard |
| 7,828,127 | B2 * | 11/2010 | Jeffries ......................... 188/307 |
| 2004/0200149 | A1 | 10/2004 | Dickmann et al. |
| 2005/0085972 | A1 | 4/2005 | Martinez |
| 2005/0177975 | A1 | 8/2005 | Wang |
| 2005/0177976 | A1 | 8/2005 | Alexander |
| 2005/0177977 | A1 | 8/2005 | Hattori et al. |
| 2005/0177978 | A1 | 8/2005 | Satoh et al. |
| 2005/0177980 | A1 | 8/2005 | Herper |
| 2005/0183338 | A1 | 8/2005 | Kasai et al. |
| 2005/0230195 | A1 | 10/2005 | Jones et al. |
| 2005/0242618 | A1 | 11/2005 | Menard |
| 2006/0238285 | A1 | 10/2006 | Dimig et al. |
| 2006/0254142 | A1 | 11/2006 | Das et al. |

FOREIGN PATENT DOCUMENTS

| | | |
|---|---|---|
| EP | 1566507 | 1/2005 |
| JP | 2001 73615 | 3/2001 |
| WO | WO 00/36255 | 6/2000 |

OTHER PUBLICATIONS

"Progress Automatic Door Products including Door Closers," (Feb. 15, 2007), http://adadoors.com/DoorClosers.htm.

* cited by examiner

AUTOMOTIVE DOOR WITH HYDRAULICALLY LOCKING REPOSITIONABLE IMMOBILIZER

CROSS REFERENCE TO RELATED APPLICATIONS

The present application claims priority to U.S. provisional application having Ser. No. 60/944,339 filed on Jun. 15, 2007.

BACKGROUND OF THE INVENTION

1. Field of the Invention

The present invention relates to a hinged vehicle door which may be selectively immobilized in a number of locations ranging from fully open to fully closed.

2. Related Art

Hinged doors are frequently used by vehicle occupants to assist during ingress and egress of the vehicle. In essence, the vehicle door is utilized as a steady rest to enable the vehicle occupant to move himself or herself either into or out of a vehicular space, such as a seat. The present inventors have determined that usage of the door in this manner would be enhanced by the ability to immobilize the door in mid-swing. As shown in U.S. Pat. No. 6,681,444, it is known to provide an apparatus which allows the door to be checked in any one of a number of positions, from fully opened to fully closed. However, the system of the '444 patent does not immobilize the door; rather, the system of the '444 patent merely increases the amount of force needed to move the door, while clearly providing that this force may be overridden and the door closed against the action of the door check. This renders the system of the '444 patent inapposite to solution of the present problem, because a door which swings free after the application of an indeterminate amount of force could inhibit the ingress/egress process by starting to swing at an inopportune time.

It would be desirable to provide an automotive door with a repositionable immobilizer permitting the door to be placed in any position and rotationally locked against further movement, so as to resist a reasonable and predictable level of force imposed by a motorist using the door to assist in entering or leaving a vehicle.

SUMMARY OF THE INVENTION

According to an aspect of the present invention, a vehicle having a swinging door includes a door mechanism with a fixed hinge half attached to a structure such as an A-pillar or hinge pillar. The fixed hinge half has a lower support leg and an upper support leg. A moveable hinge half is secured between the upper and lower support legs. The moveable hinge half has a center section which is attached to an inner panel of the door. A rotary, repositionable immobilizer device includes a hydraulic working chamber having a vane which rotates within the working chamber synchronously with rotation of the vehicle door. The vane is locked in place selectively by means of a valving mechanism attached to the chamber such that the position of the vane establishes two smaller working chambers which vary in size, depending upon the vane's position. A flow of hydraulic fluid between these two smaller working chambers is controlled by a valve operatively connected with a controller.

According to another aspect of the present invention, a switch attached to a vehicle, either on an interior part such as a door trim panel, or associated with an exterior locking device such as a lock cylinder, or at both locations, is attached to a controller which locks the immobilizer device when the switch is activated. Alternatively, a remote controller embodied in a key fob may be used to trigger immobilization of a door according to an aspect of the present invention.

It is an advantage of a system according to the present invention that a vehicle door may be selectively immobilized at the discretion of the vehicle's driver merely by triggering a switch mounted to the door trim panel, or upon a key fob, or upon an outside surface or mechanism of the vehicle, such as a lock cylinder.

It is another advantage of a system according to the present invention that a vehicle door may be immobilized without the need for extensive additional hardware, and without the need for repackaging the door hinge assemblies.

Other advantages, as well as features of the present invention, will become apparent to the reader of this specification.

BRIEF DESCRIPTION OF THE DRAWINGS

FIG. 2 is taken in the direction of the arrows labeled '2' in FIG. 1.

DETAILED DESCRIPTION OF THE PREFERRED EMBODIMENTS

Figure 1:
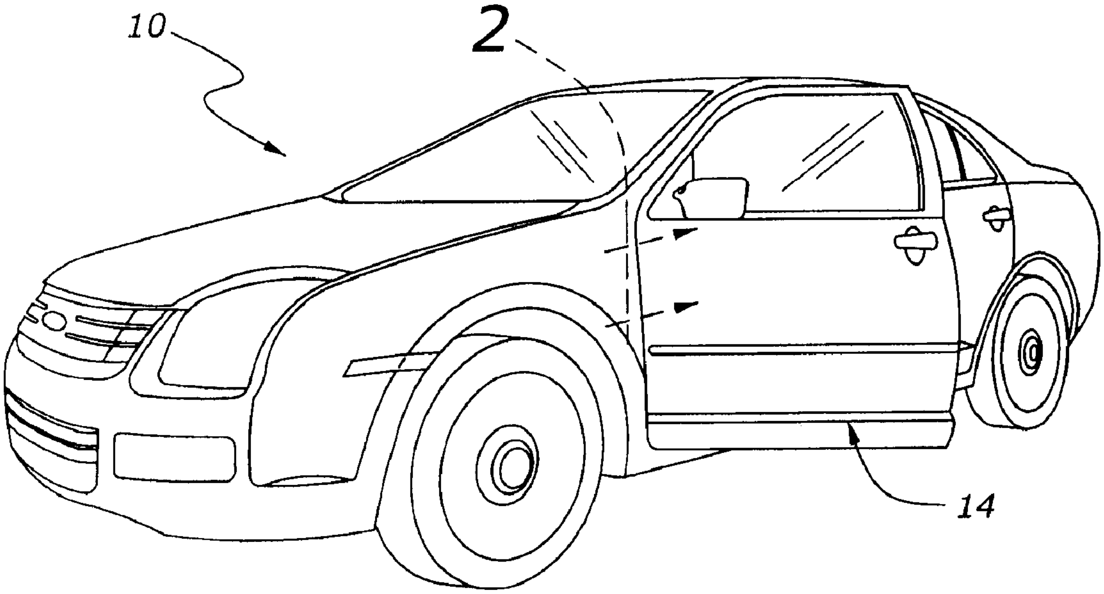
FIG. 1 is a perspective view of a vehicle having a repositionable immobilizer according to an aspect of the present invention.
Figure 1A:
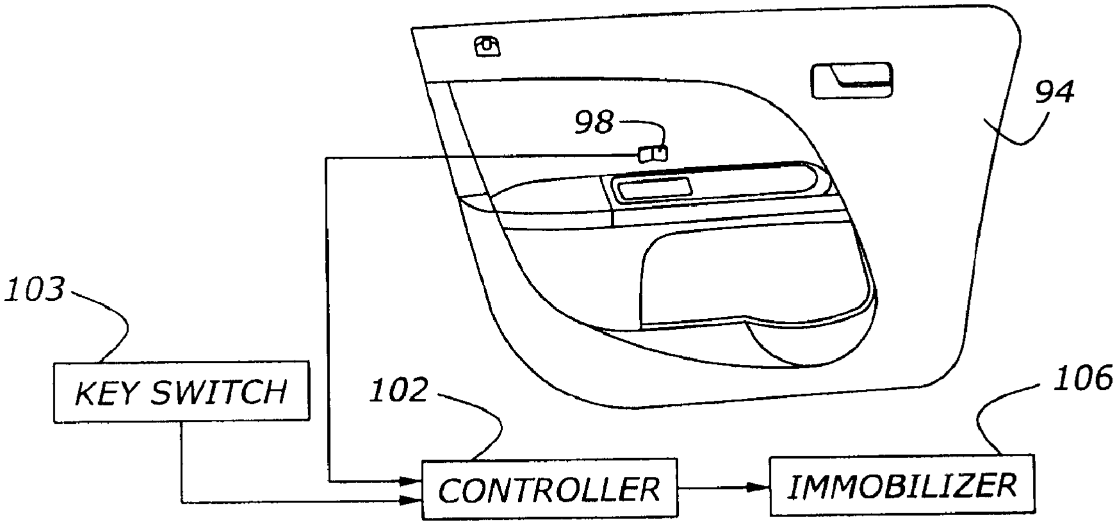
FIG. 1A is a partial block diagram showing component parts of a door system according to an aspect of the present invention.

As shown in FIG. 1, vehicle 10 has a swinging door, 14, which is equipped with a repositionable immobilizer according to the present invention. FIG. 1A shows an interior trim panel, 94, which is mounted upon an inner surface of door 14. Trim panel 94 provides a mounting surface for a manual switch, 98, which is operatively connected with a controller, 102. Controller 102, which may be configured as either a microprocessor controller, or a programmable logic controller, or other type of controller known to those skilled in the art and suggested by this disclosure, operates immobilizer 106 to fix the door position at any point desired by the vehicle's passenger. Added control capability may be achieved by incorporating a door immobilization function within a key switch, 103, incorporated in either an outer surface of door 14, or any other suitable exterior surface. Such switch may be combined, for example, with a door lock cylinder. Switch 103 may be configured as either a conventional key switch or as a touch pad key switch. Thus, as used herein, the term "key switch" refers to either configuration.

Figure 2:
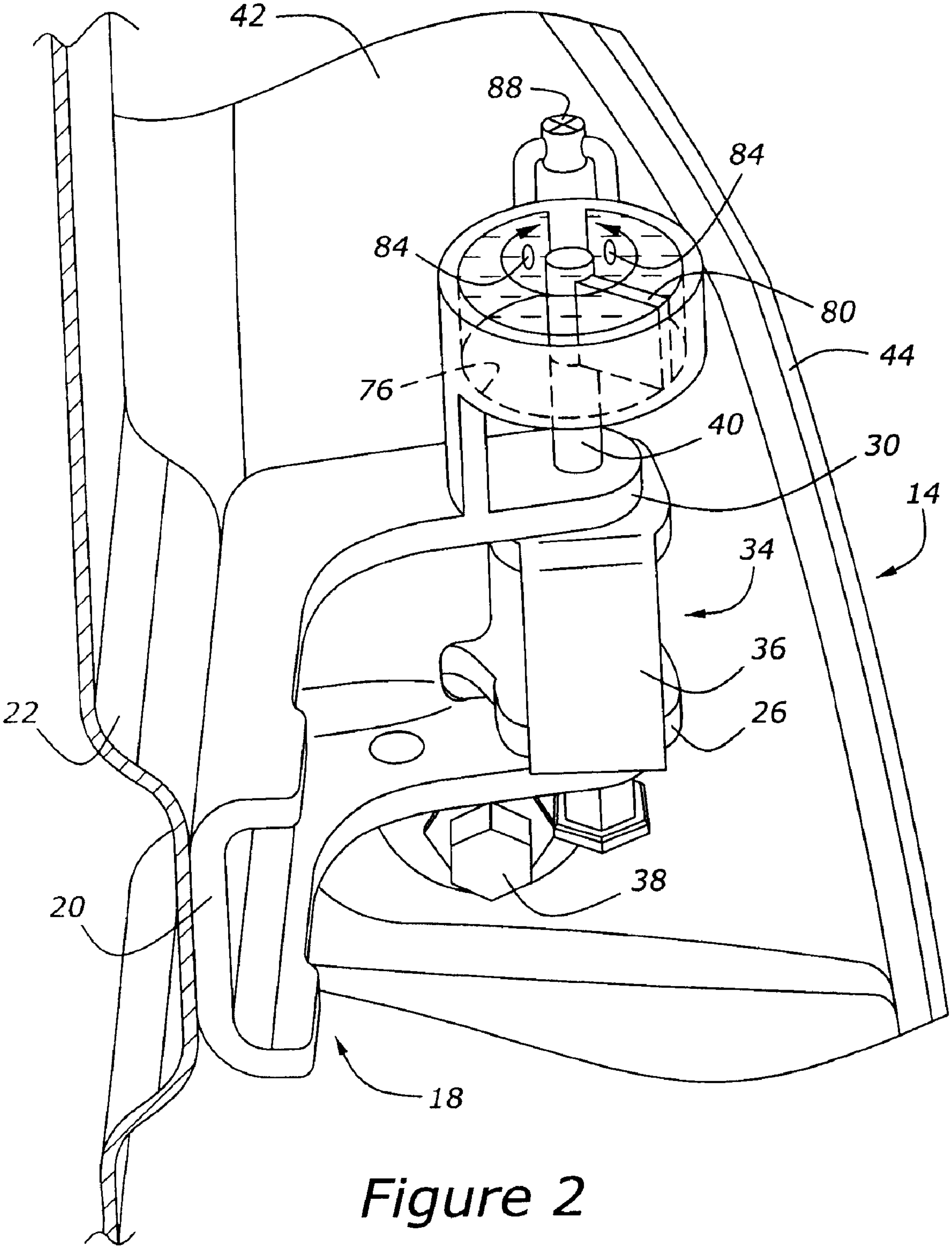
FIG. 2 is a sectional view, partially in elevation, of a door having a repositionable immobilizer according to an aspect of the present invention.

Moving now to FIG. 2, door 14 is shown as being hinged to an A-pillar, 22, of vehicle 10 by means of a hinge having a fixed hinge half, 18, with a base, 20, to which two support legs, namely upper support leg, 30, and lower support leg, 26, are attached. Fixed hinge half 18 may be mounted to A-pillar 22 or to another suitable automotive body structure, such as a B-pillar, by means of welding or by threaded fasteners or by adhesives, by any one or any combination of commonly known fastening methods.

A repositionable immobilizer according to an aspect of the present invention further includes moveable hinge half 34, having a center section 36, which is bored or cored for a hinge pin, 40. Hinge pin 40 rotates with center section 36 as door 14 is opened or closed. Moveable hinge half 34 is attached to door inner panel 42 by means of cap screws 38, it being understood that alternatively, moveable hinge half 34 may be attached to door inner panel 42 by means of welding, adhesives, and other types of fastening methods known to those skilled in the art and suggested by this disclosure.

The present door swing immobilizer utilizes hydraulic operating principles. A working chamber, 76, which is filled with hydraulic fluid, has a vane, 80, mounted for rotation therein. Vane 80 is attached to hinge pin 40, and working chamber 76 is mounted upon upper portion 30 of fixed hinge half 18. As door 14 is caused to rotate by an occupant of vehicle 10, vane 80 rotates within working chamber 76. In effect, vane 80 defines two variable sub-volumes, or smaller working chambers, within working chamber 76. Ports 84 connect each of the two variable volumes defined by vane 80 to a control valve, 88, which is in turn connected with controller 102. When valve 88 is open, door 14 and vane 80 are free to rotate because hydraulic fluid may easily move from one of the sub-chambers defined by vane 80 to the other of the sub-chambers. However, when valve 88 is closed, vane 80 is hydrostatically locked in whatever rotational position it was placed by the vehicle's occupant before switch 98 was closed, because hydraulic fluid will be confined within working chamber 76 on both sides of vane 80.

Closure of switch 98 immobilizes vane 80, and therefore, door 14. An advantage of the device of FIG. 2 is that valve 88 may be closed, either completely or partially. If valve 88 is first closed only partially, door 14 may be brought to a soft, hydraulically damped, stop, as opposed to the hard stop which would result from rapid, complete closing of valve 88. If valve 88 is closed completely vane 80 will be locked in place, thereby immobilizing, or locking, door 14, thereby preventing door 14 from swinging on its hinges until such time as switch 98 is moved to a released position. Alternatively, if valve 88 is closed only partially, door 14 may be allowed to move, albeit with resistance arising from the forcing of fluid from one of ports 84 and through valve 88 to the other of ports 84.

Figure 3:
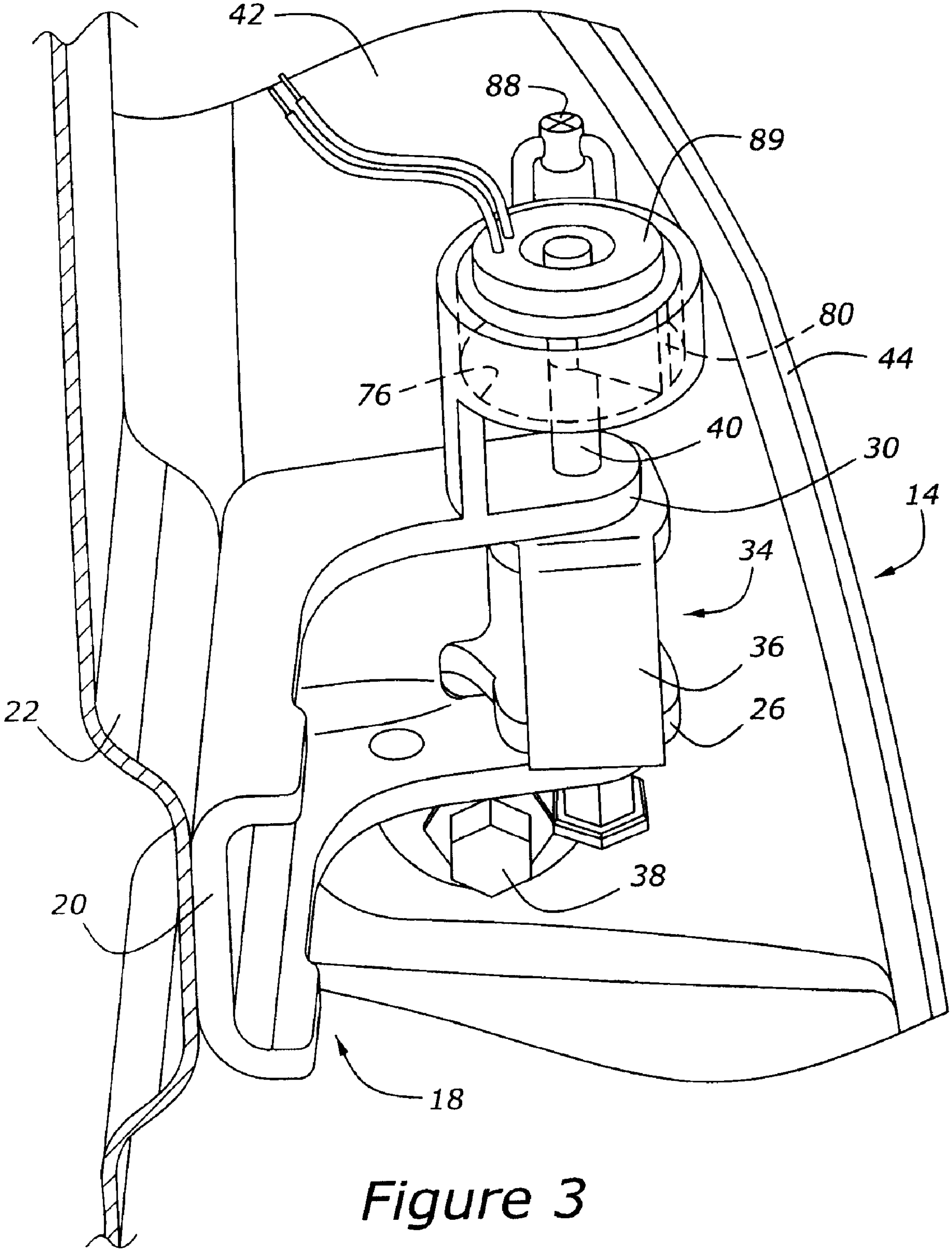
FIG. 3 is similar to FIG. 2, but shows the repositionable immobilizer of FIG. 2 having a rotary position sensor.

FIG. 3 is another embodiment of a hydraulically locking rotary device incorporating position sensing of hinge pin 40 and rotor 80. Rotary position sensor 89 provides a position signal to controller 102, enabling the controller to track the position of door 14. This ability is useful for at least two functions. In the first case, a vehicle occupant may use switch 98 to select a position for stopping door 14, with switch 98 being configured as a rotary dial switch or slide switch, either with, or without, a digital readout or other graphical display.

The second door function enabled by position sensor 89 relates to the rate of closing or opening of door 14. If, for example, a motorist opens the door in the face of a vigorous wind, either door 14 may be damaged, or, at the very least, door 14 may be difficult for the motorist to control. However, the signal from position sensor 89 enables controller 102 to determine the swinging speed of door 14, so that if door 14 begins to move at too great a rotational speed, valve 88 may be closed partially to damp the door's motion by hydrostatically inhibiting rotation of vane 80 and door 14.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An automotive door, comprising:

a door hinged to a vehicle body, so as to permit ingress and egress of the vehicle; and a door immobilizer positioned between the door and the body of a vehicle, with said immobilizer comprising:

a first member which is moved rotationally by said door when said door is moved rotationally; and a second member, attached to the body of the vehicle, for hydraulically and selectively inhibiting rotational motion of said first member, wherein said first member comprises a vane which rotates synchronously with said door, and with said second member comprising a hydraulic working chamber surrounding said vane, such that said vane divides said working chamber into a plurality of sub-chambers, and with said door further comprising a rotary position sensor, operatively associated with said vane, for providing a vane position signal to a controller.

2. An automotive door according to claim 1, wherein the controller is responsive to a switch mounted upon a door trim panel.

3. An automotive door according to claim 1, wherein the controller is responsive to a key switch mounted upon an exterior surface of the door.

4. An automotive door according to claim 1, wherein said second member further comprises a valve, operated by said controller, for controlling a flow of hydraulic fluid between said sub-chambers when said vane is rotating within said working chamber.

5. An automotive door according to claim 1, wherein said controller operates said valve to damp the motion of the door in the event that said vane position signal indicates that the swing speed of the door exceeds a predetermined threshold value.

6. An automotive door, comprising:

a door hinged to a vehicle body, so as to permit ingress and egress of the vehicle; and a door immobilizer positioned between the door and the body of a vehicle, with said immobilizer comprising:

a vane which is movable rotationally by said door when said door is moved rotationally;

a working chamber, sealingly engaged by said vane, with said working chamber having a valve for controllably restricting a flow of hydraulic fluid from one side of said vane to another side of said vane, whereby rotational motion of the door may be selectively damped; and a sensor for determining the rotational position of said door, with said sensor being operatively connected with a controller for operating said valve to hydrostatically lock said vane when a predetermined position has been reached, whereby further rotational movement of the door will be prevented until the valve has been opened by the controller.

7. An automotive door according to claim 6, further comprising a sensor for determining the speed of rotation of the door, with said sensor being operatively connected with a controller for operating said valve to hydrostatically inhibit rotation of said vane and said door in the event that the door achieves a rotational speed in excess of a predetermined threshold value.

8. An automotive, door, comprising:

a door hinged to a vehicle body, so as to permit ingress and egress of the vehicle; and a door immobilizer positioned between the door and the body of a vehicle, with said immobilizer comprising:

a vane which is movable rotationally by said door when said door is moved rotationally;

a working chamber, sealingly engaged by said vane, with said working chamber having a valve for controllably restricting a flow of hydraulic fluid from one side of said vane to another side of said vane, whereby rotational motion of the door may be selectively damped; and a sensor for determining the rotational position of said door, with said sensor being operatively connected with a controller for operating said valve to hydrostatically lock said vane when a selected position has been reached, whereby further rotational movement of the door will be prevented until the valve has been opened by the controller.

9. An automotive door according to claim 8, wherein said sensor comprises a rotary position sensor operatively associated with said vane.

10. An automotive door according to claim 8, wherein said controller is further responsive to a key switch mounted upon an exterior surface of the door.

* * * * *